UNITED STATES PATENT OFFICE.

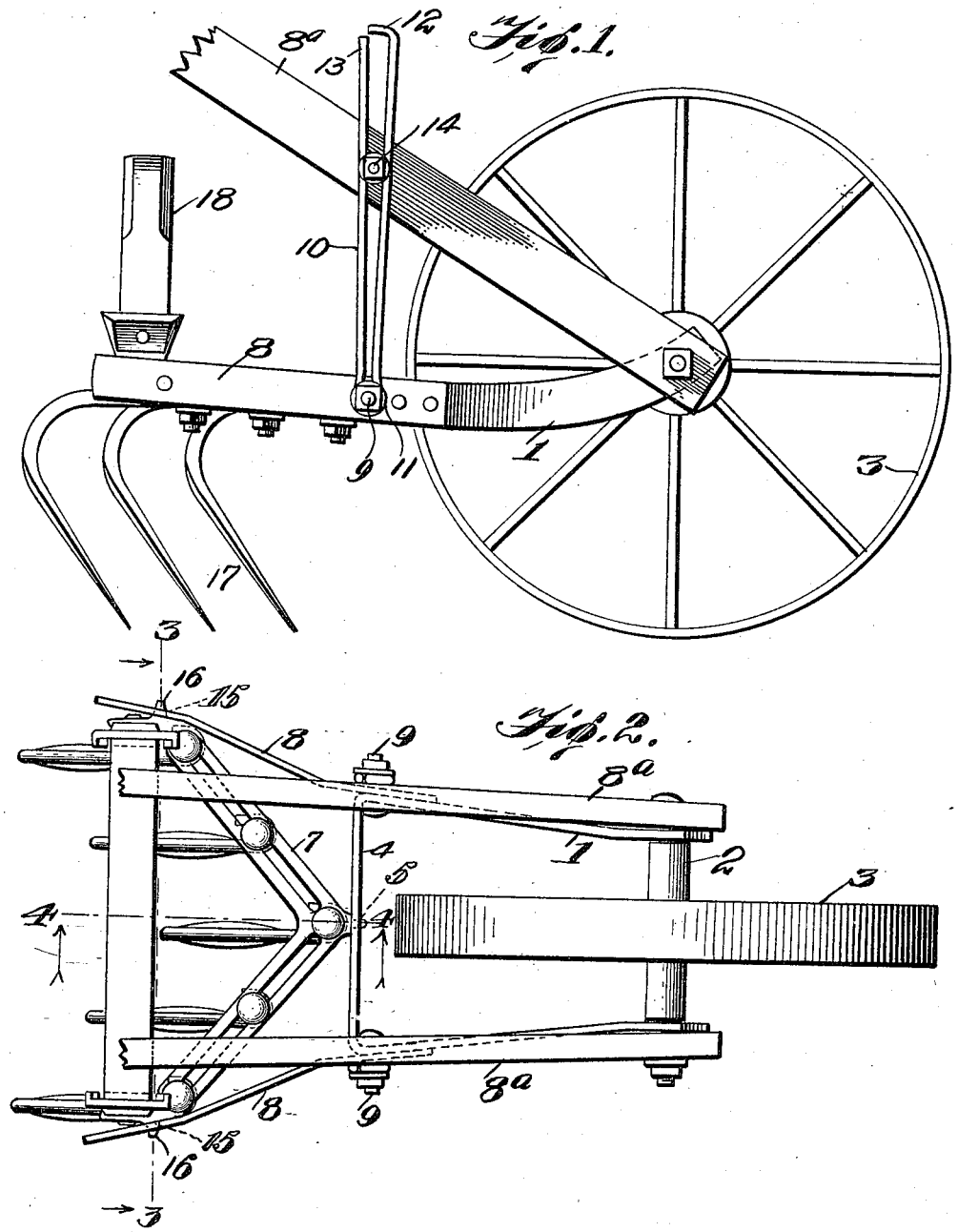

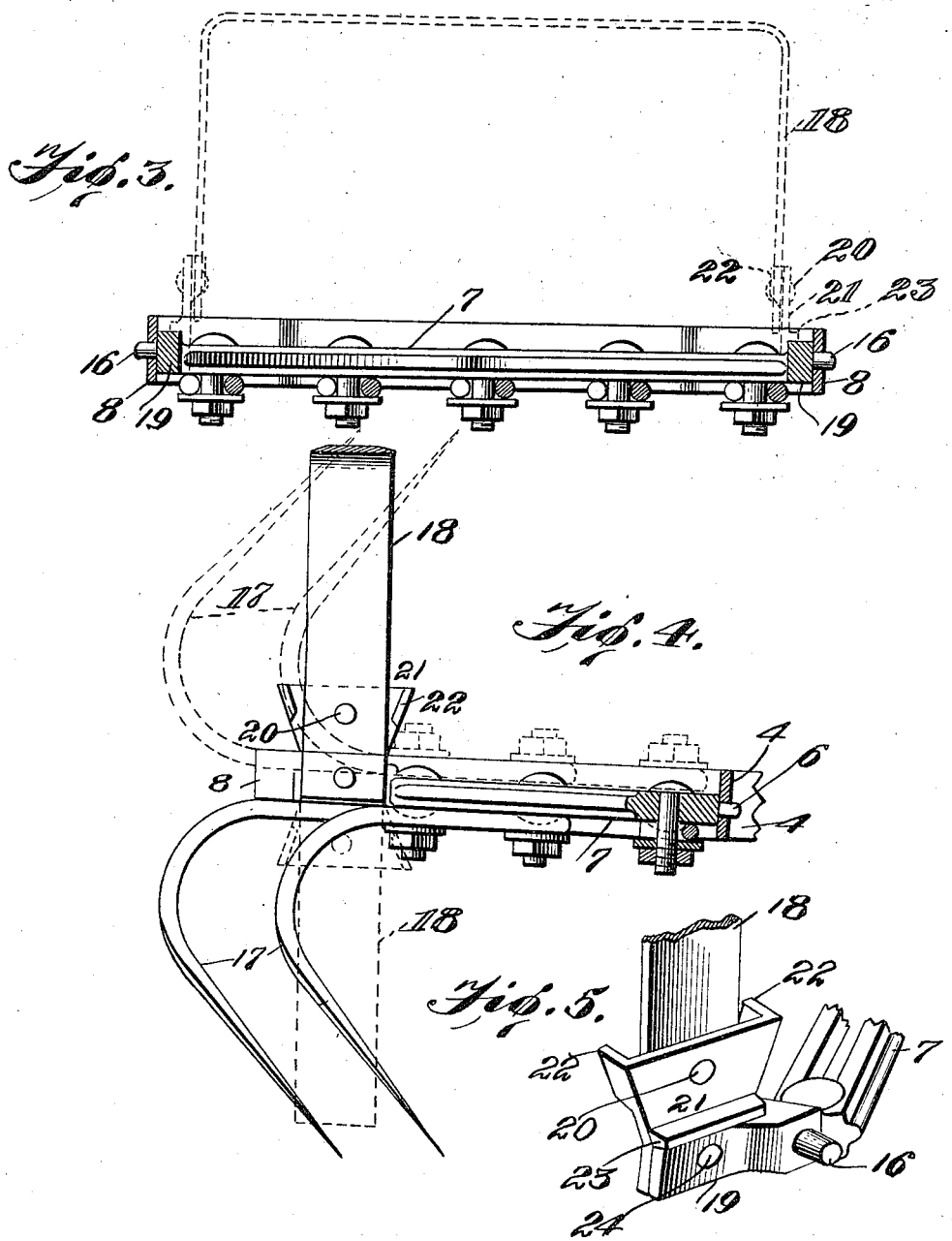

JAMES G. ALEXANDER, OF AMES, IOWA, ASSIGNOR TO ALEXANDER MFG. CO., INC., OF AMES, IOWA.

GARDEN-CULTIVATOR.

1,309,831.  Specification of Letters Patent.  Patented July 15, 1919.

Application filed September 21, 1918. Serial No. 255,093.

*To all whom it may concern:*

Be it known that I, JAMES G. ALEXANDER, citizen of the United States, residing at Ames, in the county of Story and State of Iowa, have invented certain new and useful Improvements in Garden-Cultivators, of which the following is a specification, reference being had therein to the accompanying drawings.

This invention relates to a garden cultivator and has for its object the improvement of the construction of the means for detachably holding the reversible head upon the frame.

With these and other objects in view, my invention comprises certain novel combinations and constructions, as is clearly illustrated in the accompanying drawings, and fully described and pointed out in the following description and the appended claims.

In the drawings:

Figure 1 is a view in side elevation of a cultivator constructed in accordance with present invention, while Fig. 2 is a top plan view of the cultivator shown in Fig. 1.

Fig. 3 is a sectional view taken on line 3—3, Fig. 2, and looking in the direction of the arrows.

Fig. 4 is a sectional view taken on line 4—4, Fig. 2, and looking in the direction of the arrows.

Fig. 5 is a fragmentary, perspective view of the pintle ends of the reversible head.

Referring to the drawings by numerals, 1 designates the substantially U-shaped frame, within the forward end of which is positioned the axle 2, to which is secured the wheel 3. At the middle of the rear straight-portion 4, of the frame 1, is an aperture shown by dotted line 5 (Fig. 2) that receives the forward pintle 6 of the reversible head 7.

Suitable handles $8^a$ are supported upon the frame 1 at their forward ends.

Spring sides 8 are secured at their front ends to the sides of frame 1 by means of bolts 9; these bolts 9 also support the lower ends of braces 10 for the handle $8^a$. Each brace 10 is provided at its lower end with an eye-like portion 11 and the ends of eye terminate in the substantially parallel spring sides, one side provided at its upper end with a right angle extension 12 and the upper end 13 of the other side adapted to fit under extension 12 of the other side. The bolt 14 is positioned between the spring sides 8 of the brace 10 and by reason of the nut and washer carried thereby the handle, in each instance, can be adjusted in a vertical plane to accommodate the operator by merely loosening the nut on bolt 14.

The body structure of the frame of my reversible head is similar in many particulars to the head shown in my prior United States patent granted June 27, 1916, and bearing number 1,188,874, and in such instances as the structure is the same, I will not specifically describe said common structure, as reference may be had to my patent for the specific understanding of the head details as disclosed in this application.

Each spring side 8 is provided near its outer end with an aperture shown by dotted line 15, Fig. 2, and in these apertures are positioned side pintles 16 of the reversible head 7, Fig. 3. These sides 8 can be easily sprung out by the operator for releasing the head 7 and allowing of the reversement thereof for permitting the rake portion 17 or the hoe or scraper portion 18 to be used, as desired; the outer apertured ends of the spring sides snap over the pintles 16 and hold the head upon the frame.

At each side of the reversible head 7, I have provided a pintle block 19 that is positioned at an angle to the main portion of the head and on this block 19 is formed the pintle 16 preferably integral therewith. At the ends of the hoe portion 18 I have pivotally mounted, at 20, (on both sides) a frame 21 that has limiting flanges 22 which prevent the hoe portion 18 from pivoting too far in either front or backward direction, so as to keep the hoe in proper position for cutting or working the dirt as desired. To brace this frame 21 upon the pintle block an integral flange 23 is formed longitudinal of the frame 21 and this flange rests upon the top of block as shown in Fig. 5 and rivet or other fastening means 24 is employed for fixedly securing frame 21 to block 19.

From the foregoing description, it will be noted that my reversible head is provided with two sets of tillage tools. Most garden cultivators carry but one set of tillage tools, and when the operator wants to change equipment, one set must be removed before the other one can be attached, which often causes delay in finding the tools desired, and in making the change, also such changing requires one with some experience to set the tools just right, but with my improvement, once the tools are properly attached to the head, any one can make the change from one implement to another implement without use of even a wrench. This adapts my cultivator in a special way for use of the house-wife and children, who could not take a wrench and take off one set of implements and put on another.

To make the change with these spring sides, pull outwardly on the springs until the pintles on the sides of the head are free from the apertures in the sides near their outer ends. This pulling on said sides will allow the head to be removed; to replace said head, first insert forward pintle 6 in the aperture 5 in the cross or straight portion of the substantially U-shaped frame, then pull outwardly on the spring sides 8 and put the pintles 16 in the apertures 15, whereupon the head will be assembled with the frame.

This construction has proven in actual practice very satisfactory, inasmuch as it is efficient, simple, light, and easy and handy to manipulate.

What I claim is:

1. In a cultivator, the combination with a frame, of freely movable spring sides secured to said frame, and a reversible head positioned between said freely-movable spring sides and capable of being quickly attached or detached by springing said sides outwardly.

2. In a cultivator, the combination with a frame, of freely-movable spring sides, secured at the forward end to said frame, said frame provided with an aperture and said sides provided with apertures, a head provided with a plurality of pintles, one pintle fitting into said aperture of the frame and the other pintles fitting into said apertures of the freely-movable sides, and said head provided with tillage tools.

3. In a garden cultivator, the combination with a frame, said frame provided with freely movable spring sides, tillage tool carrying means provided with rearwardly extending parallel pintle carrying blocks, positioned between said spring sides, and the pintles of said blocks extending through said sides.

4. In a garden cultivator, the combination with a frame, of a head carried by said frame, said head provided at opposite sides with hoe-portion supporting frames, and each of said last mentioned frames provided with substantially parallel flanges, and a hoe portion pivotally mounted upon said last mentioned frames between said flanges.

5. In a garden cultivator, the combination with a frame, of sides carried by said frame, of a reversible head between said sides, said head provided at opposite sides with horizontal pintle blocks, each block provided with an outwardly extending pintle, a frame fastened to each block, a flange on said frame and bearing against the top of the block, said frame also provided with hoe-portion limiting parallel flanges, a hoe portion pivotally mounted upon said frames between said flanges, and the pintles of the blocks adapted to extend through the sides attached to the frame, for securing the head upon the sides and frame.

6. In a cultivator of the class described, the combination of a detachable head provided with outwardly-extending pintles, a frame provided with laterally-movable spring sides, and said spring sides provided with outer apertured ends adapted to snap over the pintles on the head for holding the head in position upon the frame.

7. In a cultivator of the class described, the combination with a frame, of a detachable and reversible head provided with transversely-alined outwardly-extending pintles, a frame provided with laterally-movable spring sides, and said spring sides being provided with horizontal apertures formed therein near their outer ends, said apertures being adapted to receive the pintles of the head when the spring sides are snapped upon the head, whereby the head is retained in an assembled position upon the frame, but can be entirely detached from the frame by merely springing the sides outwardly for releasing the pintles.

JAMES G. ALEXANDER.

Copies of this patent may be obtained for five cents each, by addressing the "Commissioner of Patents, Washington, D. C."